(12) United States Patent
Marshak et al.

(10) Patent No.: US 8,868,798 B1
(45) Date of Patent: Oct. 21, 2014

(54) TECHNIQUES FOR MODELING DISK PERFORMANCE

(75) Inventors: Marik Marshak, Newton, MA (US); Adnan Sahin, Needham, MA (US); Hui Wang, Upton, MA (US); Xiaomei Liu, Natick, MA (US); Sachin S. More, Northborough, MA (US)

(73) Assignee: EMC Corporation, Hopkinton, MA (US)

( * ) Notice: Subject to any disclaimer, the term of this patent is extended or adjusted under 35 U.S.C. 154(b) by 732 days.

(21) Appl. No.: 12/924,361

(22) Filed: Sep. 24, 2010

(51) Int. Cl.
G06F 3/00 (2006.01)

(52) U.S. Cl.
USPC .......................................................... 710/29

(58) Field of Classification Search
None
See application file for complete search history.

(56) References Cited

U.S. PATENT DOCUMENTS

| | | | |
|---|---|---|---|
| 6,088,766 A | 7/2000 | Bachmat et al. | |
| 6,237,063 B1 | 5/2001 | Bachmat et al. | |
| 6,442,650 B1 | 8/2002 | Bachmat et al. | |
| 6,557,074 B1 | 4/2003 | Michel et al. | |
| 6,584,545 B2 | 6/2003 | Bachmat et al. | |
| 6,711,649 B1 | 3/2004 | Bachmat et al. | |
| 7,281,105 B1 | 10/2007 | Wang et al. | |
| 7,281,106 B1 | 10/2007 | Arnan et al. | |
| 7,334,092 B1 | 2/2008 | Wang et al. | |
| 7,363,453 B1 | 4/2008 | Arnan et al. | |
| 7,908,408 B2 * | 3/2011 | Kono | 710/16 |
| 8,433,848 B1 | 4/2013 | Naamad et al. | |
| 2006/0074970 A1 * | 4/2006 | Narayanan et al. | 707/102 |

OTHER PUBLICATIONS

Marshak, et al., "Techniques for Automated Evaluation and Movement of Data Between Storage Tiers," U.S. Appl. No. 12/803,571, filed Jun. 30, 2010.
Marshak, et al., "Techniques for Dynamic Data Storage Configuration in Accordance With an Allocation Policy," U.S. Appl. No. 12/803,570, filed Jun. 30, 2010.
EMC SMC Symmetrix Optimizer, "Symmetrix Optimizer," Engineering White Paper, Dec. 2, 2003, 32 pps.

* cited by examiner

*Primary Examiner* — Henry Tsai
*Assistant Examiner* — Juanito Borromeo
(74) *Attorney, Agent, or Firm* — Muirhead and Saturnelli, LLC

(57) ABSTRACT

Described are techniques for determining whether to move data between devices. A first cost metric is determined for a first device and a second device. At least one portion of data is selected for movement from one of the first device and the second device to another of the first device and the second device. A second cost metric is determined for the first device and the second device based on moving said at least one portion of data between said first device and said second device. It is determined using the first cost metric and the second cost metric whether to move the at least one portion of data.

20 Claims, 11 Drawing Sheets

TECHNIQUES FOR MODELING DISK PERFORMANCE

BACKGROUND

1. Technical Field

This application generally relates to data storage, and more particularly to techniques used in connection with data storage system performance.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. Such storage devices and data storage systems are provided, for example, by EMC Corporation of Hopkinton, Mass. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units, logical devices or logical volumes. The logical disk units may or may not correspond to the actual physical disk drives. Allowing multiple host systems to access the single storage device unit allows the host systems to share data stored therein.

In connection with data storage systems, an optimizer may be used to evaluate whether to move data between physical devices in order to obtain improved data storage system performance through load balancing. In some existing systems, the optimizer may perform such evaluation when considering whether to move data between devices having the same performance characteristics based on physical device utilization.

SUMMARY OF THE INVENTION

In accordance with one aspect of the invention is a method for determining whether to move data between devices comprising: determining a first cost metric for a first device and a second device, said first cost metric being a sum of a first mathematical product and a second mathematical product, said first mathematical product being a result of a first response time for said first device multiplied by a first processing rate for said first device indicating a number of I/O operations processed per unit of time, said second mathematical product being a result of a second response time for said second device multiplied by a second processing rate for said second device indicating a number of I/O operations processed per unit of time; selecting at least one portion of data for movement from one of said first device and said second device to another of said first device and said second device; determining a second cost metric for the first device and the second device based on moving said at least one portion of data between said first device and said second device, said second cost metric being a sum of a third mathematical product and a fourth mathematical product, said third mathematical product being a result of a third response time for said first device multiplied by a third processing rate for said first device indicating a number of I/O operations processed per unit of time, said fourth mathematical product being a result of a fourth response time for said second device multiplied by a fourth processing rate for said second device indicating a number of I/O operations processed per unit of time; and determining, using said first cost metric and said second cost metric, whether to move said at least one portion of data. The first and second devices may be disks and the at least one portion of data may include one or more logical volumes of storage. The method may be performed by an optimizer in connection with performing optimization processing on a data storage system. The at least one portion of data may include a first portion located on said first device and a second portion located on said second device. The step of selecting may include selecting said first portion for movement from said first device to said second device and selecting said second portion for movement from said second device to said first device, wherein the second cost metric reflects movement of said first portion to said second device and said second portion to said first device. The first cost metric may correspond to a current data storage configuration and said second cost metric may correspond to an alternative data storage configuration being evaluated by an optimizer as a candidate for data movement. The first device and second device may have one or more different device performance characteristics, each of said device performance characteristics characterizing drive performance capabilities. The first device may be a first type of disk drive having first performance characteristics and said second device may be a second type of disk drive different from said first type having second performance characteristics different from said first performance characteristics. The method may include adjusting said first response time to said third response time, said first processing rate to said third processing rate, said second response time to said fourth response time, and said second processing rate to said fourth processing rate in accordance with said selecting and using performance characteristic information for said first device and said second device. The performance characteristic information may include first performance characteristic information for devices of said first type for I/O operations of a first size, said first performance characteristic information including a plurality of processing rates indicating a number of I/O operations processed per unit of time for devices of said first type and, for each of said plurality of processing rates, a corresponding response time. The method may include adjusting a first value determined using said performance characteristic information for I/O operations of said first size to a second value used in connection with I/O operations of a second size. The first value and said second value may be either processing rates indicating a number of I/O operations processed per unit of time or response times. When the first device has a first RAID protection level and said second device has a second RAID protection level different from said first RAID protection level, the method may further comprise adjusting said first processing rate, said second processing rate, said third processing rate and said fourth processing rate in accordance with differences between said first RAID protection level and said second RAID protection level and in accordance with moving said at least one portion of data between said first device and said second device. The method may also include determining whether the second cost metric is less than the first cost metric. The method may also include determining whether the second cost metric indicates that the second configuration provides an improvement over the first configuration by a threshold amount. The threshold amount may be represented as a percentage.

In accordance with another aspect of the invention is a computer readable medium comprising code stored thereon for determining whether to move data between devices, the computer readable medium comprising code for: determining a first cost metric for a first device and a second device, said first cost metric being a sum of a first mathematical product and a second mathematical product, said first mathematical product being a result of a first response time for said first device multiplied by a first processing rate for said first device indicating a number of I/O operations processed per unit of time, said second mathematical product being a result of a second response time for said second device multiplied by a second processing rate for said second device indicating a number of I/O operations processed per unit of time; selecting at least one portion of data for movement from one of said first device and said second device to another of said first device and said second device; determining a second cost metric for the first device and the second device based on moving said at least one portion of data between said first device and said second device, said second cost metric being a sum of a third mathematical product and a fourth mathematical product, said third mathematical product being a result of a third response time for said first device multiplied by a third processing rate for said first device indicating a number of I/O operations processed per unit of time, said fourth mathematical product being a result of a fourth response time for said second device multiplied by a fourth processing rate for said second device indicating a number of I/O operations processed per unit of time; and determining, using said first cost metric and said second cost metric, whether to move said at least one portion of data. The first device and the second device may be disks and the at least one portion of data includes one or more logical volumes of storage. The code on the computer readable medium may be executed in connection with performing optimization processing on a data storage system. The at least one portion of data may include a first portion located on said first device and a second portion located on said second device. Said selecting may include selecting said first portion for movement from said first device to said second device and selecting said second portion for movement from said second device to said first device. The second cost metric may reflect movement of said first portion to said second device and said second portion to said first device. The first cost metric may correspond to a current data storage configuration and the second cost metric may correspond to an alternative data storage configuration being evaluated by an optimizer as a candidate for data movement, wherein said first device and second device have one or more different device performance characteristics. Each of the device performance characteristics may characterize drive performance capabilities.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
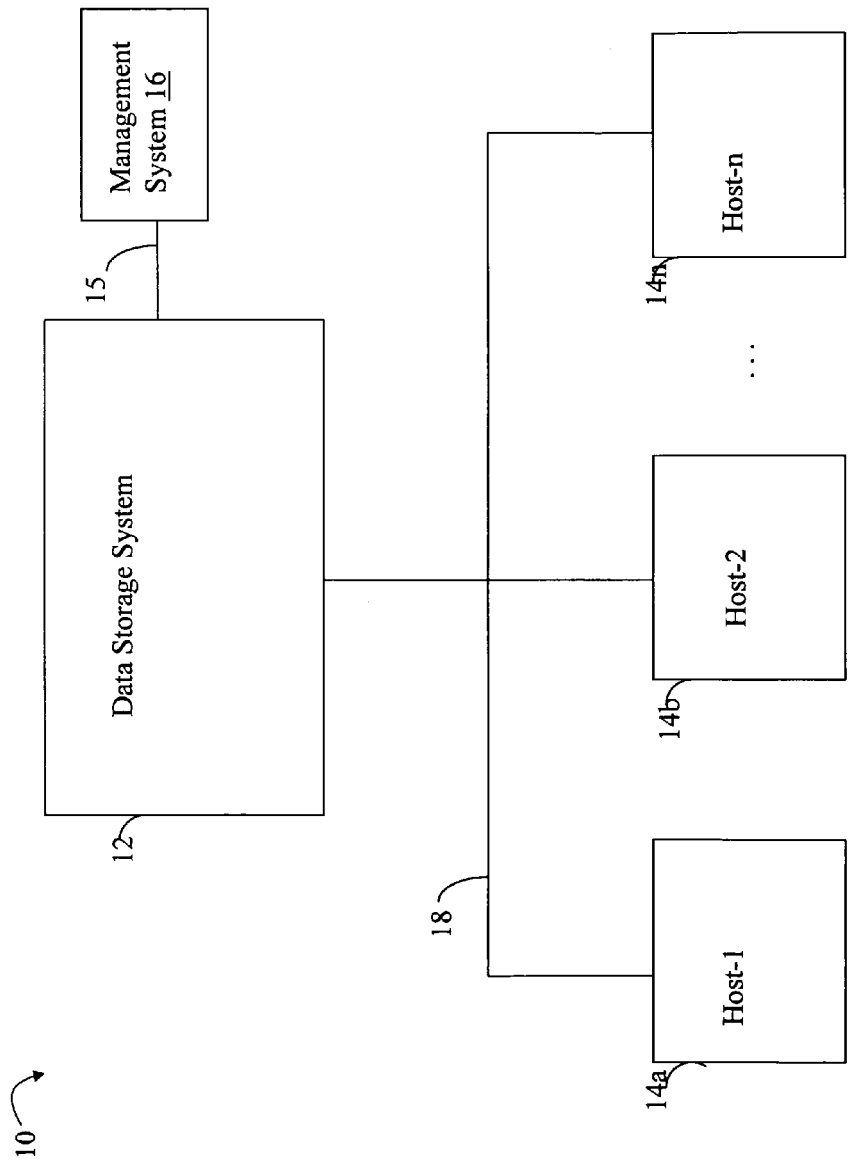
FIG. 1 is an example of an embodiment of a computer system that may utilize the techniques described herein.

Referring to FIG. 1, shown is an example of an embodiment of a system that may be used in performing the techniques described herein. The system 10 includes a data storage system 12, such as a data storage array, connected to host systems 14a-14n through communication medium 18. The data storage system 12 is also connected to management system 16 through communication medium 15. In this embodiment of the system 10, the N hosts 14a-14n may access the data storage system 12, for example, in performing input/output (I/O) operations or data requests. The communication mediums 15, 18 may be any one or more of a variety of networks or other type of communication connections as known to those skilled in the art. Each of the communication mediums 15, 18 may be a network connection, bus, and/or other type of data link, such as a hardwire or other connections known in the art. For example, the communication mediums 15, 18 may be the Internet, an intranet, network or other wireless or other hardwired connection(s) by which the data storage system 12 communicates with other components such as host systems 14a-14n and the management system 16.

Each of the host systems 14a-14n and the data storage system 12 included in the system 10 may be connected to the communication medium 18 by any one of a variety of connections as may be provided and supported in accordance with the type of communication medium 18. Similarly, the data storage system 12 and management system 16 are also connected to the communication medium 15. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n, management system 16, and data storage system 12 may all be located at the same physical site, or, alternatively, may also be located in different physical locations. Examples of the communication medium that may be used to provide the different types of connections between the host computer systems and the data storage system of the system 10 may use a variety of different communication protocols such as TCP/IP, SCSI, Fibre Channel, or iSCSI, and the like. Some or all of the connections by which the hosts and data storage system 12 may be connected to the communication medium 18 may pass through other communication devices, such as a Connectrix or other switching equipment that may exist such as a phone line, a repeater, a multiplexer or even a satellite.

Each of the host computer systems may perform different types of data operations in accordance with different types of administrative tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12. It should be noted that the data storage system 12 of FIG. 1 may physically be a single data storage system, such as a single data storage array as EMC's Symmetrix™ data storage system, as well one or more other data storage systems as may vary with embodiment.

The management system 16 may be used in connection with facilitating collection and analysis of data regarding performance of the data storage system 12 as well as possibly other components. The management system 16 may include code stored and executed thereon to perform processing of the data collected. The performance data collected may include information regarding the I/O performance in connection with data storage system 12. This performance data may relate to, for example, performance measurements in connection with a data request as may be made from the different host computer systems 14a 14n. This performance data may be gathered and stored in a storage area. The particular data collected as well as the processing that may be performed in connection with analysis of the collected data are described in more detail in following paragraphs. The management system 16 may include any one or more different forms of computer-readable media known in the art upon which the code used in connection with the techniques herein is stored. Computer-readable media may include different forms of volatile (e.g., RAM) and non-volatile (e.g., ROM, flash memory, magnetic or optical disks, or tape) storage which may be removable or non-removable.

It should be noted that the management system 16 may exist external to the data storage system 12 and may communicate with the data storage system 12 using any one of a variety of communication connections. In one embodiment, the management system 16 may communicate with the data storage system 12 through three different connections, a serial port, a parallel port and using a network interface card, for example, with an Ethernet connection. Using the Ethernet connection, for example, a management system 16 may communicate directly with DAs and HAs within the data storage system 12.

Figure 2A:
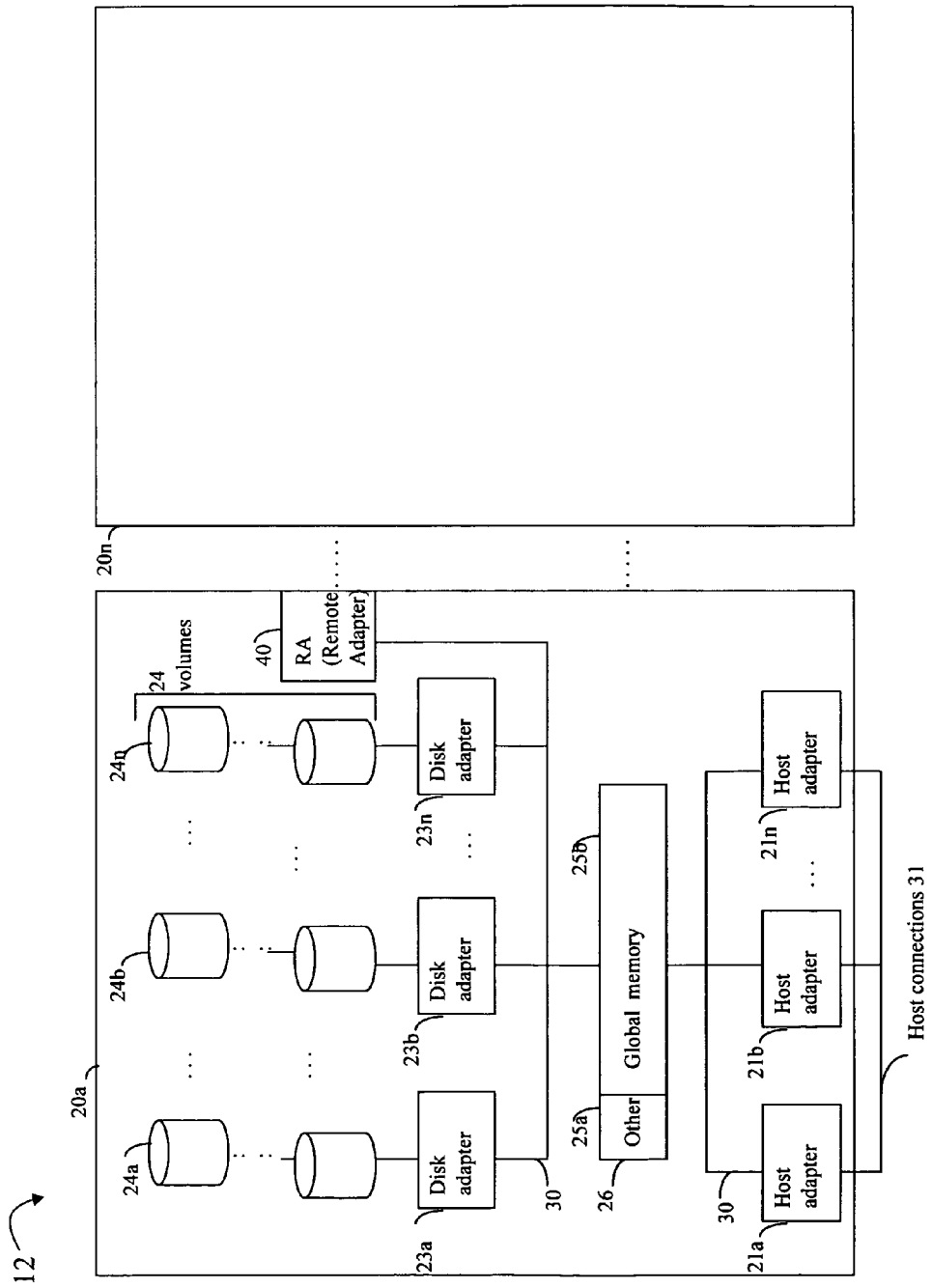
FIG. 2A is an example of an embodiment of a data storage system.

Referring to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be inter-connected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the system 10 of FIG. 1 to provide storage services to, for example, host computer systems. It should be noted that the data storage system 12 may operate stand-alone, or may also included as part of a storage area network (SAN) that includes, for example, other components.

Each of the data storage systems, such as 20a, may include a plurality of disk devices or volumes, such as the arrangement 24 consisting of n rows of disks or volumes 24a-24n. In this arrangement, each row of disks or volumes may be connected to a disk adapter ("DA") or director responsible for the backend management of operations to and from a portion of the disks or volumes 24. In the system 20a, a single DA, such as 23a, may be responsible for the management of a row of disks or volumes, such as row 24a. In a data storage system such as by EMC Corporation, a backend DA may also be referred to as a disk controller. The DA may performed operations such as reading data from, and writing data to, the physical devices which are serviced by the DA.

The system 20a may also include one or more host adapters ("HAs") or directors 21a-21n. Each of these HAs may be used to manage communications and data operations between one or more host systems and the global memory. In an embodiment, the HA may be a Fibre Channel Adapter (FA) or other adapter which facilitates host communication. Generally, directors may also be characterized as the different adapters, such as HAs (including FAs), DAs RAs and the like, as described herein. Components of the data storage system, such as an HA, which may communicate with a host may also be referred to as front end components. A component of the data storage system which communicates with a front end component, such as a DA, may be characterized as a backend component. In connection with data storage systems such as by EMC Corporation, various types of directors or adapters may be implemented as a processor, or, more generally, a component that includes the processor. Examples of directors are disk adapters (DAs), host adapters (HAs) and the like.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Also shown in the storage system 20a is an RA or remote adapter 40. The RA may be hardware including a processor used to facilitate communication between data storage systems, such as between two of the same or different types of data storage systems.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes (LVs). The LVs may or may not correspond to the actual or physical disk drives. For example, one or more LVs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LV(s) residing thereon. A LUN or logical unit number may be characterized as a disk array or data storage system reference to an amount of disk space that has been formatted and allocated for use to one or more hosts. An LV may further map, for example, to a single LUN, more than one LUN, and/or a portion of a LUN.

The DA performs I/O operations on a disk drive. Data residing on an LV may be accessed by the DA following a data request in connection with I/O operations that other directors originate.

Figure 2B:
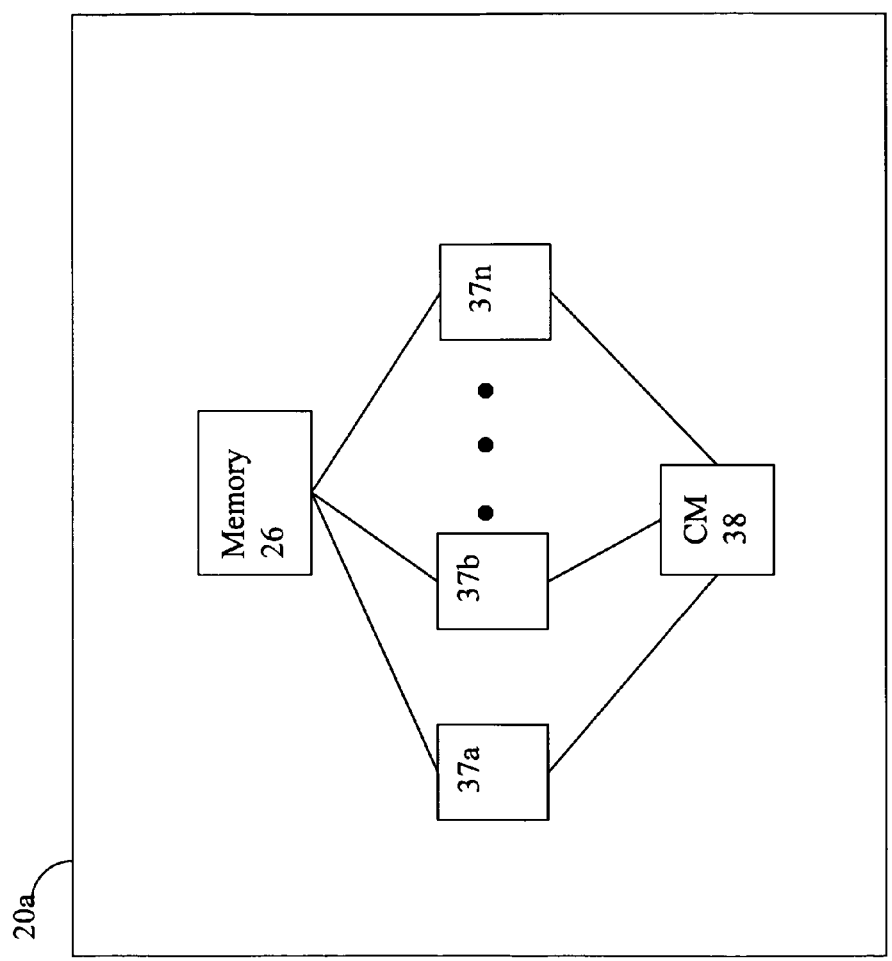
FIG. 2B is a representation of the logical internal communications between the directors and memory included in one embodiment of data storage system of FIG. 2A.

Referring to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HA's, RA's, or DA's that may be included in a data storage system. Each of the directors may be, for example, a processor or a printed circuit board that includes a processor and other hardware components. In an embodiment disclosed herein, there may be up to sixteen directors coupled to the memory 26. Other embodiments may use a higher or lower maximum number of directors that may vary. For example, an embodiment in accordance with techniques herein may support up to 128 directors per data storage system, such as a data storage array. The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

A host may be able to access data, such as stored on an LV of a data storage system, using one or more different physical paths from the host to the data storage system. Described in the following paragraphs are techniques that may be used in connection with selecting a path over which to access data of a storage device when such data is accessible over multiple paths. A host may use such techniques in connection with path selection when communicating data operations, such as I/O operations, to the data storage system.

Each of the data storage systems may include code stored and executed thereon which gathers data regarding performance of the data storage system. The code may report the collected data at various times, for example, to a management system 16 for further analysis. The code may be stored on a form of computer-readable media known in the art as described elsewhere herein. The collected data may be reported to the management system 16 in accordance with a defined polling interval. At defined times, the management system 16 may request the collected data from the data storage system. Using another technique, the data storage system may automatically report the collected data to the management system 16 in accordance with a predefined time interval rather than in response to a request from the management system 16.

An embodiment of the data storage system in accordance with techniques herein may have one or more defined storage tiers. Each tier may generally include physical storage devices or drives having one or more attributes associated with a definition for that tier. For example, one embodiment may provide a tier definition based on a set of one or more attributes. The attributes may include any one or more of a storage type or storage technology, a type of data protection, device performance characteristic(s), storage capacity, and the like. The storage type or technology may specify whether a physical storage device is an SSD (solid state storage) drive (such as a flash drive), a particular type of SSD drive (such using flash or a form of RAM), a type of magnetic disk or other non-SSD drive (such as an FC drive, a SATA (Serial Advanced Technology Attachment) drive), and the like. Data protection may specify a type or level of data storage protection such, for example, as a particular RAID level (e.g., RAID1, RAID-5 3+1, RAID5 7+1, and the like). Performance characteristics may relate to different performance aspects of the physical storage devices of a particular type or technology. For example, there may be multiple types of FC drives based on the RPM characteristics of the FC drives (e.g., 10K RPM FC drives and 15K RPM FC drives) and FC drives having different RPM characteristics may be included in different storage tiers. An embodiment may allow a user to define one or more such storage tiers. For example, an embodiment in accordance with techniques herein may define two storage tiers including a first tier of all SSD drives, a second tier of FC disk drives and a third tier of SATA disk drives. The foregoing are some examples of tier definitions and other tier definitions may be specified in accordance with techniques herein.

Described herein are techniques that may be used in connection with evaluating and determining whether to modify an existing data storage system configuration. In particular, with respect to disk devices, the techniques herein may be used in connection with evaluating whether to physically move data from a first physical device to a second physical device with the goal of achieving better performance. Evaluating whether to perform such data movement between physical storage devices may be based on response times. The response time for a storage device or volume may be based on a response time associated with the storage device or volume for a period of time. The response time may based on read and write operations directed to the storage device or volume. The techniques herein may be used in connection with an optimizer performing the foregoing evaluation in connection with determining whether to move data within a same storage tier. The techniques herein may also be used in connection with determining whether to move data between storage tiers of disk devices such as between tiers of disk devices. For example, the techniques herein may be used in connection with evaluating whether to move data between a first storage tier of FC devices to a second storage tier of SATA, between a first storage tiers of FC devices having first performance characteristics (e.g., 15K RPM drives) and a second storage tier of FC devices having second performance characteristics (e.g., 10K RPM drives), and the like. Other performance characteristics characterizing a type of device in a storage tier may include device capabilities such as related to I/O throughput, latency time, and the like.

In connection with techniques herein, a value that may be used in evaluating whether to move data between physical disk devices as well as select from one of a plurality of different possible candidates for such data movement is event response time. Response time represents the amount of time it takes to complete an event, such as a complete an I/O operation for a received I/O request. Response time may be characterized as including two components: service time and wait time. Service time is the actual amount of time spent servicing or completing the event. The wait time is the amount of time the event, such as the I/O request, spends waiting in line or queue waiting for service (e.g., prior to executing the I/O operation).

Figure 3:
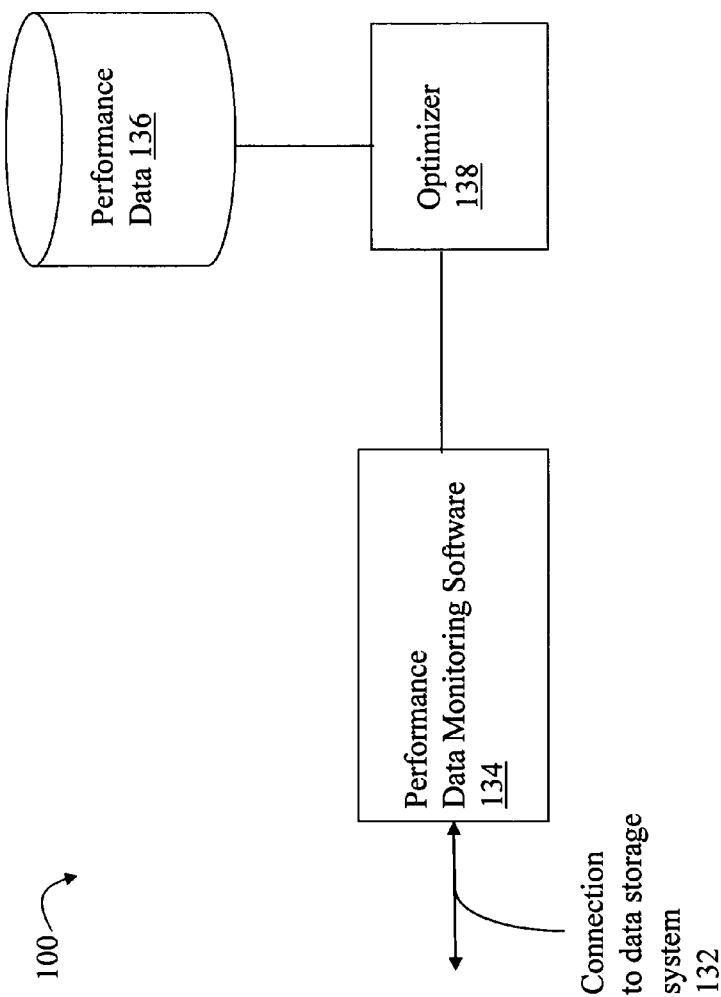
FIG. 3 is an example of components that may be included in a management system in an embodiment in accordance with techniques herein.

Referring to FIG. 3, shown is an example 100 of software that may be included in a management system 16. It should be noted that the management system 16 may be any one of a variety of commercially available computer systems, such as one including an Intel-based processor, and the like. Although what is described herein shows details of software that may reside in the management system 16, all or portions of the illustrated components may also reside elsewhere such as, for example, on any of the host systems 14a 14n.

Included in the management system 16 is performance data monitoring software 134 which gathers performance data about the data storage system 12 through the connection 132. The performance data monitoring software 134 gathers and stores performance data and forwards this to the optimizer 138 which further stores the data in the performance data file 136. This performance data 136 may also serve as an input to the optimizer 138 which attempts to enhance the performance of I/O operations, such as those I/O operations associated with data storage devices 16a-16n of the system 12. The optimizer 138 may take into consideration various types of parameters and performance data 136 in an attempt to optimize particular metrics associated with performance of the data storage system 12. The performance data 36 may be used by the optimizer to determine metrics described and used in connection with techniques herein. The optimizer may access the performance data, for example, collected for a plurality of LVs, physical devices, and the like, when performing a data storage optimization. The performance data 36 may be used in determining a workload for one or more physical devices, logical devices or volumes (LVs) and the like. The workload may also be a measurement or level of "how busy" a device is, for example, in terms of I/O operations (e.g., I/O throughput such as number of I/Os/second, and the like). The optimizer 38 may perform processing of the techniques herein set forth in following paragraphs in connection with evaluating whether to move data between physical devices such as disk drives. The optimizer 38 may also perform other processing such as, for example, to determine what particular LVs to store on physical devices of a particular tier, evaluate when to migrate or move data between physical drives of different tiers or within the same tier, and the like. It should be noted that the optimizer 138 may generally represent one or more components that perform processing as described herein as well as one or more other optimizations and other processing that may be performed in an embodiment.

Workload such as for an LV or component of the data storage system may be determined using some measure of I/O intensity, performance or activity (e.g., I/O throughput/second, percentage or number of read operations processed in a time period, percentage or number of write operations processed in a time period, read hits, read misses, and the like).

Other measurements of how busy an LV or component is may be expressed in other ways. For example, response times and utilization are metrics measuring a level of busyness. The response time as mentioned above may be determined based on workload data collected. In connection with techniques herein, the response times described herein may be determined from the data storage system's perspective as the amount of time measured from when an I/O operation is received by a front end data storage system component, such as an FA, to when the FA has completed servicing the I/O operation (e.g., so that the I/O operation is no longer considered pending or in-progress on the data storage system).

Data used in connection with techniques herein, such as the performance data of FIG. 3 used in determining physical device and LV workloads, may be obtained through observation and monitoring actual performance. Data may also be determined in other suitable ways such as, for example, through simulation, estimation, and the like. Observed or collected data may be obtained as described in connection with FIG. 3 by monitoring and recording one or more aspects of I/O activity for each LV. For example, for each LV, an average number of reads occurring within a given time period may be determined, an average number of writes occurring within a given time period may be determined, an average number of read misses occurring within a given time period may be determined, and the like. It should be noted that the operations of read and write with respect to an LV may be viewed as read and write requests or commands from the DA, controller or other backend physical device interface. Thus, these are operations that may also be characterized as a average number of operations with respect to the physical storage device (e.g., average number of physical device reads, writes, and the like, based on physical device accesses). This is in contrast to observing or counting a number of particular type of I/O requests (e.g., reads or writes) as issued from the host and received by a front end component such as an FA. To illustrate, a host read request may not result in a read request or command issued to the DA if there is a cache hit and the requested data is in cache. The host read request results in a read request or command issued to the DA to retrieve data from the physical drive only if there is a read miss. Furthermore, when writing data of a received host I/O request to the physical device, the host write request may result in multiple reads and/or writes by the DA in addition to writing out the host or user data of the request. For example, if the data storage system implements a RAID data protection technique, such as RAID-5, additional reads and writes from the back end or DA perspective may be performed such as in connection with writing out additional parity information to the physical device for the user data. Thus, observed data gathered to determine workload, such as observed numbers of reads and writes, may refer to the read and write requests or commands performed by the DA. Such read and write commands may correspond, respectively, to physical device accesses such as disk reads and writes that may result from a host I/O request received by an FA.

Figure 4:
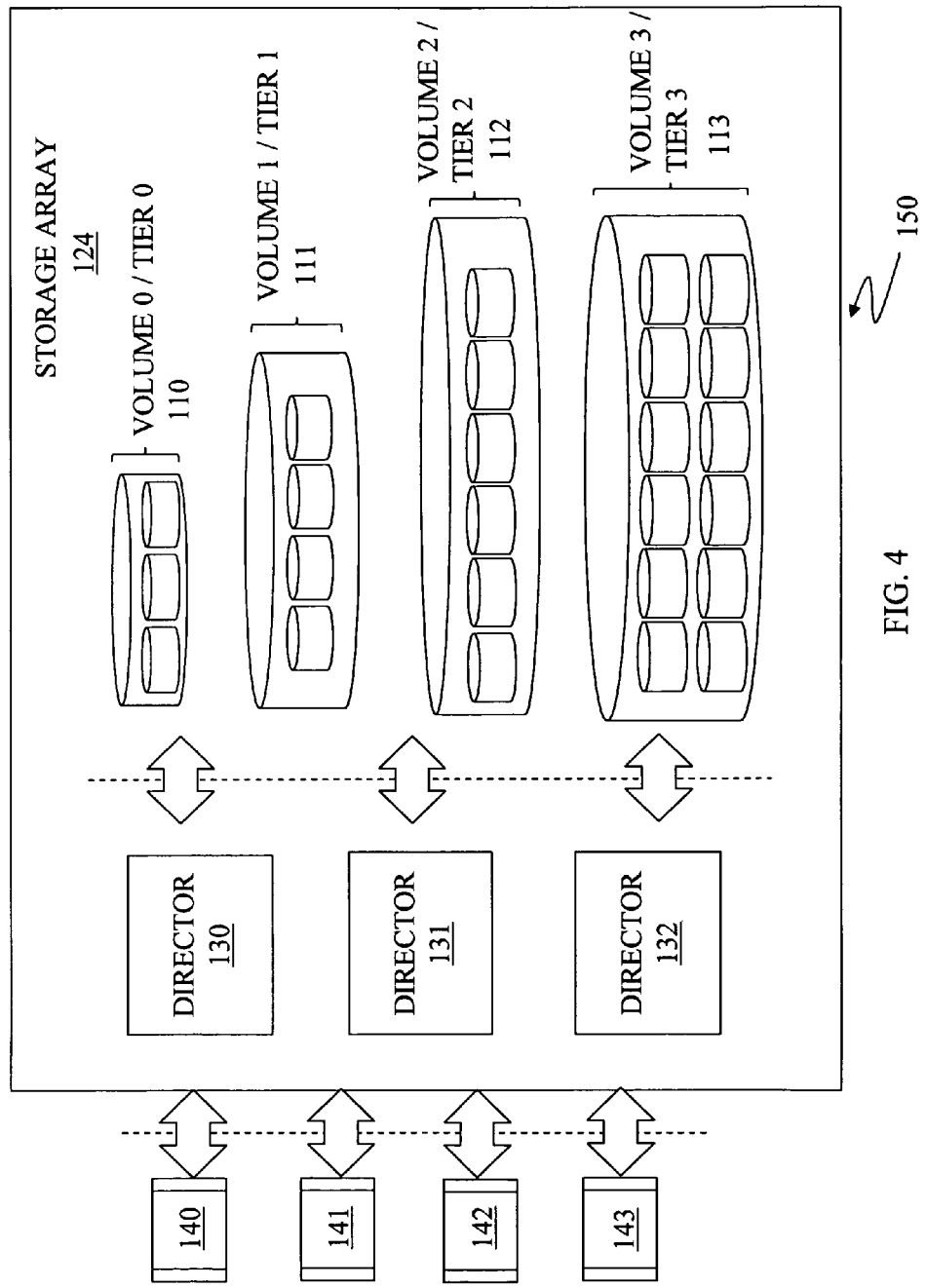
FIGS. 4 and 5 are example illustrating a multi-tiered storage system, such as data storage array, including a plurality of storage tiers in an embodiment in accordance with techniques herein.

FIG. 4 is a schematic illustration showing a storage system 150 that may be used in connection with an embodiment of the system described herein. The storage system 150 may include a data storage array 124 having multiple directors 130-132 and multiple storage volumes (LVs, logical devices or VOLUMES 0-3) 110-113. Host applications 140-144 and/or other entities (e.g., other storage devices, SAN switches, etc.) request data writes and data reads to and from the storage array 124 that are facilitated using one or more of the directors 130-132. The storage array 124 may include similar features as that discussed above.

The volumes 110-113 may be provided in multiple storage tiers (TIERS 0-3) that may have different storage characteristics, such as speed, cost, reliability, availability, security and/or other characteristics. As described above, a tier may represent a set of storage resources, such as physical storage devices, residing in a storage platform. Examples of storage disks that may be used as storage resources within a storage array of a tier may include sets SATA disks, FC disks and/or flash or SSDs, among other known types of storage devices.

According to various embodiments, each of the volumes 110-113 may be located in different storage tiers. Tiered storage provides that data may be initially allocated to a particular fast volume/tier, but a portion of the data that has not been used over a period of time (for example, three weeks) may be automatically moved to a slower (and perhaps less expensive) tier. For example, data that is expected to be used frequently, for example database indices, may be initially written directly to fast storage whereas data that is not expected to be accessed frequently, for example backup or archived data, may be initially written to slower storage. In an embodiment, the system described herein may be used in connection with optimization of the use of different storage tiers including the ability to easily create and apply tiering policies to transparently automate the control, placement, and movement of data within a storage system based on business needs.

The techniques herein may be used to determine whether to move data between physical devices where such devices are non-SSD devices, such as disk devices, of the same storage tier or in different storage tiers. As described elsewhere herein, such evaluation and determination may be performed, for example, in connection with a data storage optimizer evaluating whether to move data between physical disk storage devices with a goal of improving data storage system performance.

Figure 5:
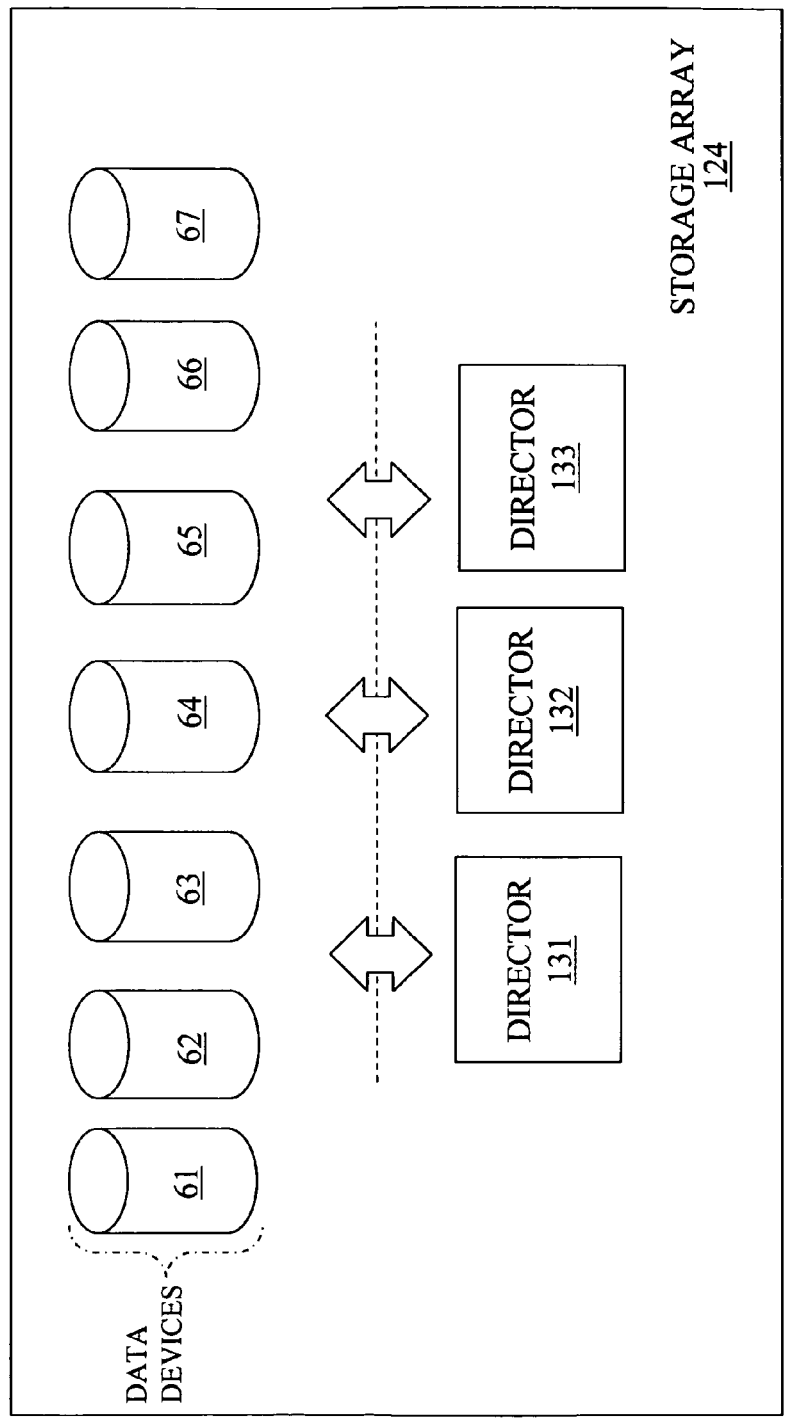

Referring to FIG. 5, shown is a schematic diagram of a data storage system such as the data storage array 124 which includes a plurality of data devices 61-67 communicating with directors 131-133. The data devices 61-67 may be implemented as logical devices like standard logical devices (also referred to as thick devices) provided in a Symmetrix® data storage system produced by EMC Corporation of Hopkinton, Mass., for example. In some embodiments, the data devices 61-67 may not be directly useable (visible) to hosts coupled to the storage array 124. Each of the data devices 61-67 may correspond to a portion (including a whole portion) of one or more of the disk drives or other physical devices. Thus, for example, the data device section 61 may correspond to an entire physical disk drive 42, may correspond to a portion of a single disk drive, or may correspond to a portion of a first disk drive and also a portion of a second disk drive. The data devices 61-67 may be designated as corresponding to different classes, so that different ones of the data devices 61-67 correspond to different physical storage having different relative access speeds or RAID protection type (or some other relevant distinguishing characteristic or combination of characteristics), as further discussed elsewhere herein.

It should be noted that the techniques herein may be used in connection with a multi-tiered storage system as well as a single tiered storage system of non-SSD devices, such as of disk drives.

In connection with techniques herein as mentioned above, response time may be considered as criteria alone, or in combination with other criteria, when evaluating whether to move data, such as for an LV, between physical storage devices in the same storage tier or in different storage tiers of non-SSD devices. The techniques herein consider different performance characteristic information and curves that may vary with each storage tier, type of physical device, device vendor, and the like.

In connection with techniques herein, consider an exemplary case for purposes of illustration where a determination is made as to whether to move data between a first physical disk D1 and a second physical disk D2. A cost metric may be determined for a first data storage configuration in which D1 and D2 contain particular portions of data stored thereon, such as data of different LVs stored on each D1 and D2. As a variation to the first data storage configuration, the optimizer may be considering one or more possible candidate or potential second data storage configurations where data is moved between D1 and D2. Such data movement may generally include moving data from D1 to D2, D2 to D1, or both of the foregoing (e.g. such as in connection with swapping data between an LV of D1 and another LV of D2). The following cost metric C may be determined for the first data storage configuration for D1 and D2:

$$C = (RT1*RATE1) + (RT2*RATE2) \qquad \text{EQUATION 1}$$

where
RATE1=current processing rate (activity level) in IOs/second of D1;
RT1=current response time (RT) of D1;
RATE2=current processing rate (activity level) in IOs/second of D2; and
RT2=current response time (RT) of D2.

It should be noted that for each physical device D1, D2, the metrics such as processing rate (e.g., RATE1, RATE2) and response time (e.g., RT1, RT2) may be determined as an aggregate metric for all data portions, such as LVs, stored on the physical device.

Similarly, the above cost metric C may also be determined for the second data storage configuration. It should be noted that each of the processing rates RATE1 and RATE 2 may also be more generally expressed in terms of I/Os with respect to other units of time.

It should be noted that RATE1 and RATE2 may be obtained using current performance data gathered as described herein characterizing observed behavior of the data storage system. As described in more detail elsewhere herein, the response times, RT1 and RT2, may be obtained using tables for the particular devices as described in following paragraphs and illustrated, for example in FIG. 8.

Figure 6:
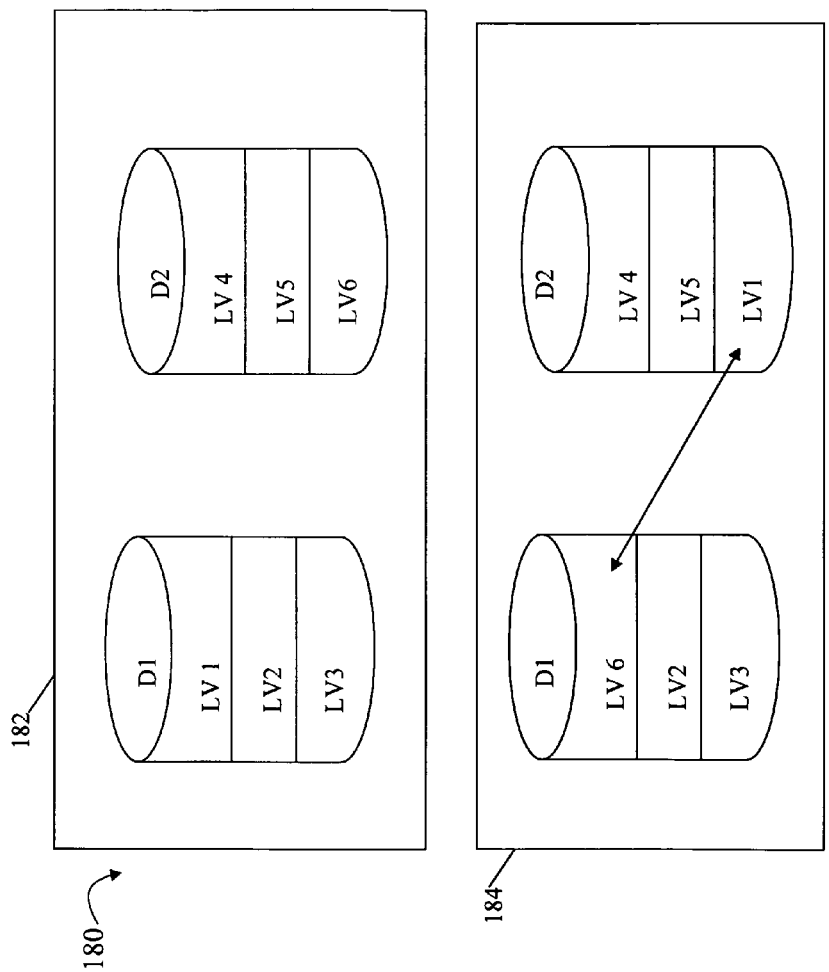
FIG. 6 is an example illustrating different configurations and selected data movement between physical devices as may be evaluated in accordance with techniques herein.

Referring to FIG. 6, shown is an example illustrating different data storage configurations. A first data storage configuration may be represented by 182 and a second data storage configuration being considered for evaluation may be represented by 184. Each configuration 182, 184 includes a representation of what LVs have data stored on each of the physical disk devices D1 and D2. In 182, LV1, LV2 and LV3 are stored on D1 and LV4, LV5 and LV6 are stored on D2. Element 184 represents a candidate configuration or proposed change for data movement between D1 and D2 where physical locations for storing data of LV1 and LV6 are swapped.

Let C1 represent the cost metric C of EQUATION 1 as determined for the first configuration 182 and let C2 represent the cost metric C of EQUATION 1 as determined for the second configuration 184. A determination as to whether to the second configuration 184 results in better performance than the first configuration 182 may be made by comparing C1 and C2. Specifically, it may be determined whether C2 is less than C1. If C2<C1, this indicates that the second configuration associated with C2 results in better performance than the current or first configuration associated with C1.

It should be noted that an embodiment may further consider additional criteria when evaluating whether to perform the data movement from the first to the second configuration. For example, in addition to C2<C1, an embodiment may include criteria requiring that the performance or cost be improved by a threshold amount that may be expressed using, or in terms of, C1 and C2. For example, an embodiment may also require that C2<=90% C1 representing the criteria that the data movement improve performance by at least 10%. Additionally, when evaluating multiple possible candidates or multiple second configurations, the cost metric C above may be determined for each and the configuration associated with the best or highest improvement over the cost metric associated with the current configuration (e.g., C1) may be selected.

Consider first a case where D1 and D2 are in the same storage tier or more generally are disk drives of the same type, having the same performance characteristics, and the like. For example, D1 and D2 may both be FC drives having the same performance characteristics and capabilities. In this case, the above-reference comparison and evaluation using C1 and C2 may be made without further consideration based on any differences in performance characteristics of the storage devices D1 and D2.

The foregoing use of C1 and C2 and the evaluation thereof may also be made with respect to D1 and D2 where D1 and D2 each have different performance characteristics (e.g., D1 and D2 are of different non-SSD storage tiers, are different types of disk drives, and the like). In this case, processing rates (e.g., I/Os/second) and corresponding RTs may vary with performance characteristic information of each device type.

Figure 7:
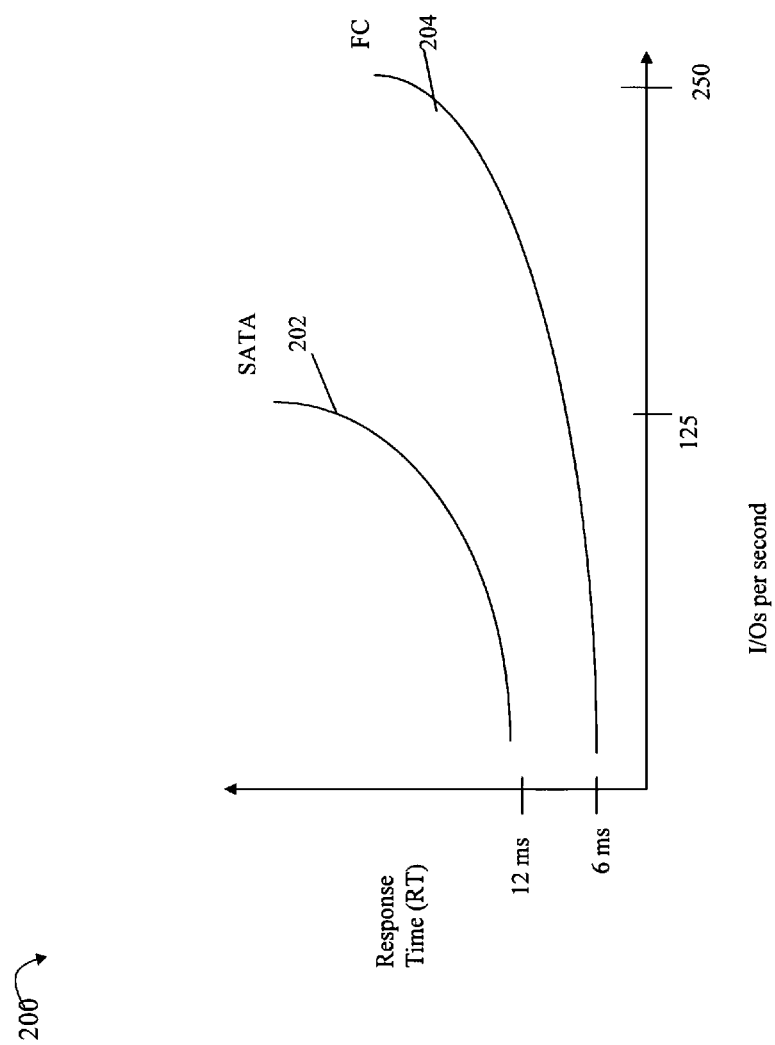
FIG. 7 is an example illustrating different performance characteristic curves for different device types as may be used in an embodiment in accordance with techniques herein.

Referring to FIG. 7, shown is an example of performance characteristic information illustrated in the form of curves for different device or disk drive types. The example 200 illustrates general curve shapes as may be associated with a SATA drive (as represented by 202) and an FC drive (as represented by 204) in connection with processing rate (X-axis in terms of IOs/second) vs. response time (Y-axis). As may be seen from the illustration 200, for a same processing rate of I/Os/second, different RTs are obtained for each of a SATA drive and an FC drive. As such, when moving data of an LV from a SATA drive to an FC drive, differences in performance characteristics such as response times are taken into consideration in accordance with techniques herein. An embodiment may store data as represented by the curves of FIG. 7 in one or more tables having rows and columns of data point values (e.g., X and Y coordinates for a plurality of points). When stored in tabular form, interpolation, curve fitting techniques, and the like, may be used in connection with determining values of X and Y coordinates lying between two existing points stored in the table. Further examples of tables of performance characteristics are described in following paragraphs. When considering moving data between devices of different types or more generally having different device characteristics, such tables of performance characteristic information may be used to determine, for a given processing rate of I/Os per second, an RT for each of the different types as needed in connection with determining the cost metric C for each configuration. For example, with reference back to FIG. 6, let D1 be an FC drive and D2 be a SATA drive, and let each of the LVs1-6 have the following processing rates in IOs/second:

LV1=10, LV2=20; LV3=30, LV4=40, LV5=50, LV6=60

In connection with the first configuration 182, D1 has a total or aggregate processing rate of 60 I/Os/second (e.g, 10+20+30 for, respectively, each of LV1, LV2 and LV3) and D2 has a total or aggregate processing rate of 150 I/Os/second (e.g, 40+50+60 for, respectively, each of LV4, LV5 and LV6). Additionally, an RT for D1 and an RT for D2 may be obtained. The foregoing processing rates may be determined, for example, using performance data collected for the first configuration which may represent an existing current in the data storage system. The RT values may be obtained using tables or curves, such as illustrated in FIG. 7, where such data may be previously determined and stored for a particular physical drive of the first configuration. The foregoing RT values and processing rates are then used in determining a cost metric C, denoted C1, for the first configuration.

In connection with the second configuration 184, D1 has a total or aggregate processing rate of 110 I/Os/second (e.g, 60+20+30 for respectively each of LV6, LV2 and LV3) and D2 has a total or aggregate processing rate of 100 I/Os/second (e.g, 40+50+10 for respectively each of LV4, LV5 and LV1). The foregoing processing rates for D1 and D2 may represent hypothetically determined processing rates modeled based on the assumption that LV6 and LV1 are to be swapped as illustrated in FIG. 6. An RT for D1 may be obtained by examining the table or performance curve 204 for FC drives and obtaining a corresponding RT value (Y coordinate) for 110 IOs/second (X-coordinate). In a similar manner, an RT for D2 may be obtained by examining the table or performance curve 202 for SATA drives and obtaining a corresponding RT value (Y coordinate) for 100 IOs/second (X-coordinate). The foregoing RT values and processing rates may be used in determining a cost metric C, denoted C2, for the second configuration. C1 and C2 may be compared to determine whether C2 results in an increase in performance which is represented by the case where C2<C1.

In connection with techniques herein, it should be noted that simplifying assumptions may be made with respect to modeling performance of the disk drives in that the disks will perform mostly random I/Os and that such I/Os will span the entire disk. These simplifying assumptions provide for modeling performance of the disk drives without requiring further consideration of performing localized I/O operations to a physical area of the drive on response time.

The foregoing performance characteristic curve of IOs/second vs RT may vary with drive type. These curves may be determined for each drive type considered and may be stored as a table. However, there is a complication in that performance curves also vary with I/O size. In other words, the foregoing performance characteristic information or curve as represented in FIG. 7 for each drive type may be for a single average I/O size. Different instances of performance characteristic information should be considered as the average I/O size varies. For each device type or set of device performance characteristics, an embodiment may use multiple tables corresponding to different average I/O sizes (e.g. 8 KB, 16 KB, and the like). However, other techniques which are computationally intensive may be used as needed to interpolate between I/O size tables. For example, an embodiment may use a table for an IO size of 8 KB and a second table for an IO size of 16 KB but if the average IO size is 9 KB, interpolation or some other technique may be performed to obtain the appropriate RT values for the average I/O size of 9 KB.

An embodiment in accordance with techniques herein may store a single set of performance characteristic information for a single average I/O size for each drive type. An embodiment may use the foregoing data for a single average I/O size for each drive type in connection with performing calculations and obtaining any adjusted values for processing rates (e.g., IOs/second) and RTs for different average I/O sizes. In such an embodiment, a single set of tables for an average I/O size may be stored and then used as a basis for determining adjusted values as needed for different I/O sizes.

Figure 8:
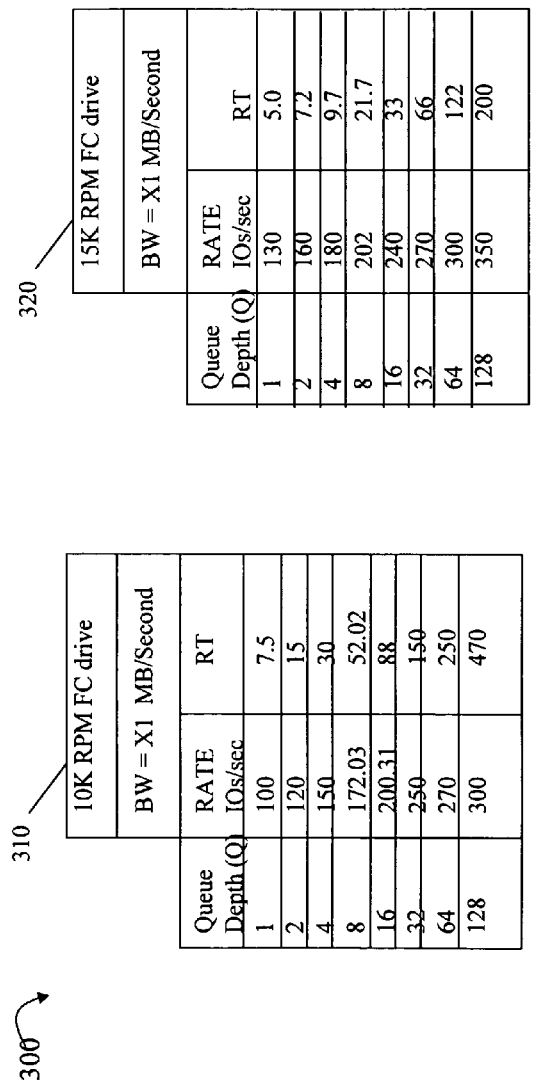
FIG. 8 is an example illustrating different performance characteristic information for different device types in table form as may be used in an embodiment in accordance with techniques herein.

Referring to FIG. 8, shown is an example of performance characteristic information in tabular form that may be used in an embodiment in connection with techniques herein. The example 300 includes a first table of information 310 for a first drive type and a second table of information 320 for a second drive type. Tables 310 and 320 may indicate RT values for corresponding processing rates in terms of I/Os per second for an average I/O size of 8 KB. Values in the tables 310 and 320 may be adjusted as will be described below in following paragraphs in connection with other average I/O sizes.

Each of the tables 310 and 320 also indicate a queue depth which represent a size of an I/O request wait queue. Values of tables 310 and 320 may be obtained through experimentation for each device type used in an embodiment. When performing such experiments to obtain data populating the tables 310 and 320, the queue depth value may be varied for those values indicated in tables.

Each of the tables 310 and 320 also includes a value denoted as "BW" representing the bandwidth or transfer rate at which only data is transferred from the device (e.g., without considering seek time and latency time related to the mechanical drive movement to position the drive head in a starting location for the transfer). BW values for the device types may be obtained by measuring the elapsed time it takes to perform sequential reads and recording the amount of data transferred during the elapsed time. For example, at time T0, data may be read from the device at a first location and data may be read sequentially from this first location to a second location. During the time elapsed, the amount of data read is determined and BW or the transfer rate may be determined as the amount of data transferred per unit of time, such as in megabytes/second (MB/second or MBPS).

The transfer time XFER for an average I/O size of B may be represented as $$XFER = B/(1024*BW) \quad \text{EQUATION 2}$$

where I/O size, B, is expressed in kilobytes (KB), and BW, the bandwidth for the drive, is in MBs/second or MBPS. When adjusting a value from one of the tables 310, 320 (e.g., RATE and RT as obtained from the tables) where the tables reflect values for average I/O size, for example, of 8 KB, "B" may represent the current average I/O size for which the adjustment is being performed. An embodiment may determine XFER for the desired "B" using EQUATION 2 above and then use the value of XFER in further equations below to appropriately adjust values from the tables 310, 320.

A data point represented as (RATE (e.g., processing rate in I/Os/second), RT, Q) for an I/O size may be obtained from a table for the device type and adjusted as follows:

$$RATE\ adj = 1/((1/RATE) + (XFER)) \quad \text{EQUATION 3}$$

wherein RATE adj is the adjusted RATE or processing rate in IOs/second (e.g., column 2 of tables 310 and 320) and XFER is as determined using EQUATION 2. RATE adj represents the values from the table properly adjusted for the desired I/O size=B.

Additionally, for the data point, the RT or response time from the table (e.g., column 3 of tables 310 and 320) may be adjusted as:

$$RT\ adj = RT + XFER*Q \quad \text{EQUATION 4}$$

where RT and XFER are as noted above and Q is the queue depth value from column 1 of tables 310 and 320. As noted above, the queue depth may be characterized as the length of the queue of I/O requests waiting for processing.

In connection with XFER as expressed using EQUATION 2, XFER may also be determined as:

$$XFER = (X\text{-TABLE SIZE})/(1024*BW) \quad \text{EQUATION 5}$$

where TABLE SIZE is the size of average I/O size in KBs of the data values of the table and X is the average I/O size for which we want to obtain a corresponding or adjusted RT and RATE. In other words, we want to convert or adjust the data values in the table computed for an I/O size of "TABLE SIZE" to corresponding data values adjusted for an I/O size of "X".

With reference to FIG. 8, the values of tables 310 and 320 may be applicable for both read and write operations and may represent aggregate values of IOs/second and response time across both read and write operations.

In connection with techniques herein, an embodiment may use criteria in connection with determining whether or not to even consider moving data of a particular physical disk device. For example, an embodiment may determine a processing rate in terms of IOs/second for each physical disk device and then sort the physical disk devices, such as in descending order, based on the processing rates. An embodiment may only consider data movement for a physical disk device if the physical device's processing rate is below or less than a threshold level. Initially, a first determination may be made as to whether any of the physical disk devices have a processing rate below this threshold As such, if all physical devices have processing rates below this threshold, the optimizer may determine that there is no physical disk device that is "busy" enough to warrant performing further evaluation or use of techniques herein. However, if at least one physical disk device has a processing rate that is above the threshold, the optimizer may determine that further processing is warranted and then perform such further processing using the techniques herein to consider all physical disk devices for optimization. In other words, having a single disk drive which is "busy" (e.g., has a processing rate above the threshold), triggers processing using the techniques herein in which all physical disk drives may be evaluated and considered for optimization for data movement. As such, when the processing rate of any single physical drive is above the threshold, the techniques herein may be used to determine cost metric C for a current data storage configuration (reflecting the current data stored on the physical device) and then one or more other cost metrics for corresponding alternative data storage configurations where data is moved between any of the physical disk drives. The techniques herein may be used for determining a cost metric C for each different configuration (e.g., current configuration and one or more alternative candidate configurations reflecting physical data movement of LV's data) and selecting one of the configurations. In one embodiment, the configuration having the highest performance as indicated by the lowest cost metric C for all configurations may be selected. It should be noted that although an embodiment of the optimizer may consider all physical disks for data movement and further evaluation using techniques herein if only a single physical drive is deemed sufficiently busy, an embodiment may also optionally not consider for evaluation two drives if both such drives are not sufficiently busy (e.g., both do not have processing rates above the threshold).

In one embodiment, different thresholds may be used in connection with determining whether disk drives of different types are "busy" enough to consider as a candidate for data movement. For example, one embodiment may determine such thresholds for physical drives based on 10% of the maximum disk throughput or maximum processing rate that can be achieved for the particular device type.

When moving data such as for one or more LVs between physical disk devices, an embodiment may also consider protection type and level changes such as, for example, RAID protection level changes. The above description assumes that the RAID protection levels are the same for both the source and target physical disk devices of a data movement. For example, when moving an LV from D1 to D2, the RAID protection level of D1 and D2 may be the same in connection with the above description. However, in the event that D1 and D2 have different levels of data protection such as different RAID levels of protection, adjustments may be made to the processing rates such as the rate of IOs/second since the actual physical disk reads and/or writes performed to complete a host write I/O operation of user data may vary with RAID protection level. For example, completing a host write I/O operation to an LV with RAID-6 includes writing the user data along with reading and/or writing associated parity information. For a single host write operation, the additional physical device accesses (e.g., from the DA or backend perspective) in terms of reads and writes performed by the DA for RAID-6 are different than those obtained when the single host write operation is performed with respect to a RAID-1 (mirror) device with no parity. An embodiment may also make adjustments as needed to I/Os/second or processing rates to account for any such difference in protection levels.

Following is a description of adjustments that may be made with respect to host IOs when moving data between physical disk devices of different RAID types. It should be noted that the processing rates obtained and described above such as in the tables is as determined from performance data collected from the back end or DA's perspective.

Based on the RAID protection type for disk devices, each host write processed by the back end or DA component will result in the following IO activity (backend IO here refers to IO commands going to disk drives). As an example to further illustrate, note the following with respect to several different RAID levels.

a. In RAID-1, each host write is written to both mirrors. As a result, we see two backend write IOs for each host write IO.
b. In RAID-5, due to parity calculation, each host write turns into two backend reads and two backend writes.
c. In RAID-6, due to double parity calculations, each host write turns into three backend reads and three backend writes.

It should be noted that not all front-end or host IOs result in performing a backend I/O operation or disk access. Consider the case where the same track/sector is overwritten multiple times by the host. In this case, each host write to the same track/sector may not appear as a write on the back end since such writes may be performed with respect to a copy of the write pending (WP) data in cache. The techniques herein may be performed base on a simplifying assumption, that all host I/Os result in corresponding operations in the back end (e.g. result in one or more corresponding DA disk accesses). Let's assume that host issues r reads IOs/ssec and w writes IOs/sec, and all of these read and write IOs ends up in the backend. Under these assumptions, we expect to observe the following in the DA or backend for three RAID types.

|  | RAID-1 | RAID-5 | RAID-6 |
|---|---|---|---|
| Backend Reads/s | $r_1 = r$ | $r_5 = r + 2w$ | $r_6 = r + 3w$ |
| Backend Writes/s | $w_1 = 2w$ | $w_5 = 2w$ | $w_6 = 3w$ |

Based on the foregoing, for example, consider LV1 currently having data stored on D1 with RAID-1 protection with a current read I/O rate of 100 reads/second and a current write I/O rate of 50 writes/second. The foregoing may be characterized as rates with respect to the host or front end component (e.g. FA, HA) of the data storage system which receives I/O requests from the host. A configuration change is considered in which LV1's data is moved to D2 having RAID-5 protection. When considering the workload of D2 with the configuration change of having LV1's data moved from D1 to D2, a translation or conversion of the current read I/O rate and write I/O rate of LV1 may be considered. Based on the foregoing host or front end rates, the read I/Os/second for RAID-1 may be 100 reads/second and 100 writes/second (e.g., # host writes, w, results in "2*w" backend or DA write operations by above chart) for back end operations. If LV1 is moved to physical storage having RAID-5 protection, the same host or front end activity results in back end activity rates of 200 reads/second (e.g., backend read operations=# host read operations+2*number of host write operations, r+2w, where r=100 and 2w=100 by above chart) and 100 writes/second (e.g. backend writes=2w, or twice the number of host writes).

It will be appreciated by those of ordinary skill in the art that the foregoing may be used in connection with translating DA or back end processing rates (e.g. IOs/second) as described above and used in connection with techniques herein from one RAID protection type to another other than those described for purposes of example and illustration.

It should be noted that in connection with performing any processing rate conversions due to data movement between physical devices of different RAID protection levels, it may be necessary for an embodiment to record not just the total number of IOs/second as an aggregate but rather determine a first metric representing the number of read IOs/second and a second metric representing the number of write IOs/second. Use of such separate metrics may be needed in order to perform the conversion where the conversion requires separate consideration and calculation for reads and writes such as described above in connection with different RAID protection levels. Additionally, and more generally, an embodiment may perform other necessary conversions between I/O rates for different physical devices when considering different data movement candidate configurations. For example, with reference back to FIGS. 7 and 8, the processing rate in I/Os second may be represented as an aggregate or combined metric for read and write operations. However, it may be that for a particular drive type, there is a significant difference with respect to read and write performance in terms of resulting response times. As such, it may be necessary to separately convert and consider a rate of read operations/second and a rate of write operations/second. Additionally, a different bandwidth or BW value may be determined for each of read operations and write operations for the drive type. To further illustrate, a first type of SATA drive having a particular RPM may be characterized by the following performance characteristic information:

| READ BW = X MB/sec | | | Write BW = Y MB/sec | | |
|---|---|---|---|---|---|
| Q | IOs/sec | RT | Q | IOs/sec | RT |
| 1 | 75.2 | 15 | 1 | 40 | 19 |
| 2 | 80.3 | 30 | 2 | 45 | 38 |
| 4 | 90.2 | 45 | 4 | 50 | 90 |
| 8 | 120.25 | 80 | 8 | 52 | 150 |
| 16 | 125 | 150 | 16 | 58 | 250 |
| 32 | 133 | 500 | 32 | 61 | 400 |

In this case using such a SATA drive having the above-referenced characteristics, an embodiment may perform conversions and look up values in a table for use with the techniques as described herein with respect to each of read operations and write operations rather than with respect to an aggregate of both read and write operations. For example, an embodiment may use a table as described in connection with FIG. 8, which has information for all I/O operations (e.g., considers read and write operations in the aggregate providing one set of information in the table). As a variation in connection with drives such as the SATA drive noted above, the table may contain separate information for each of the read and write operations which may be used in connection with techniques herein.

Figure 9A:
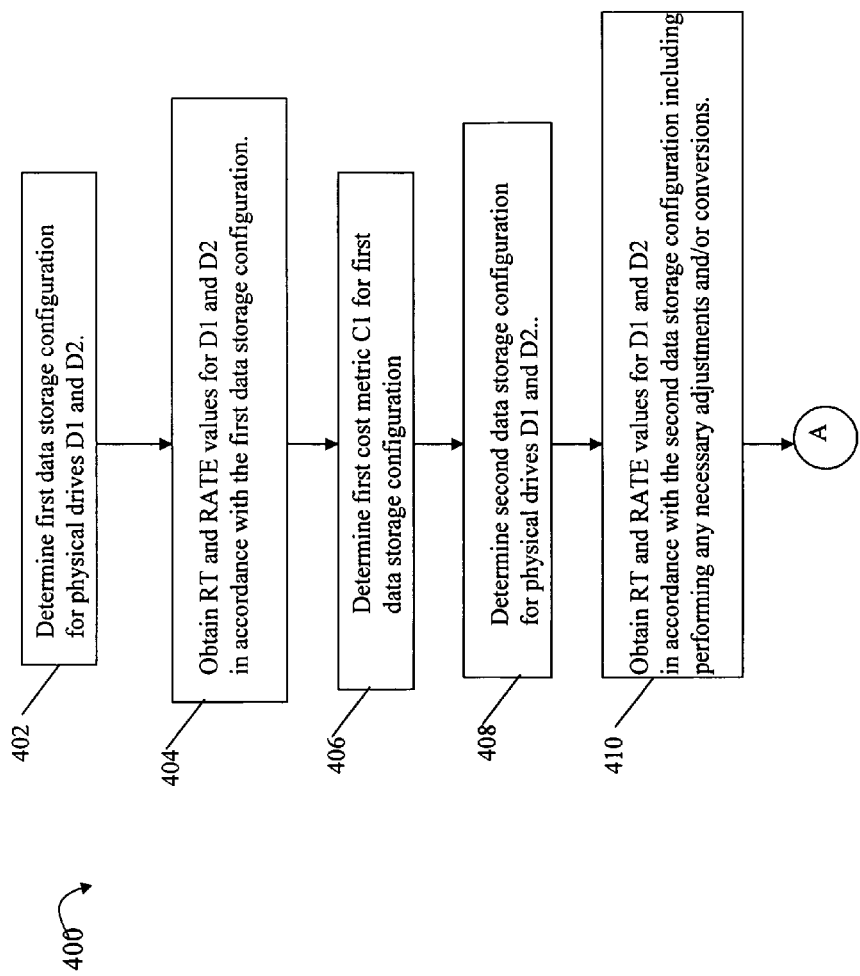
FIGS. 9A and 9B are flowcharts of processing steps that may be performed in an embodiment in accordance with techniques herein.
Figure 9B:
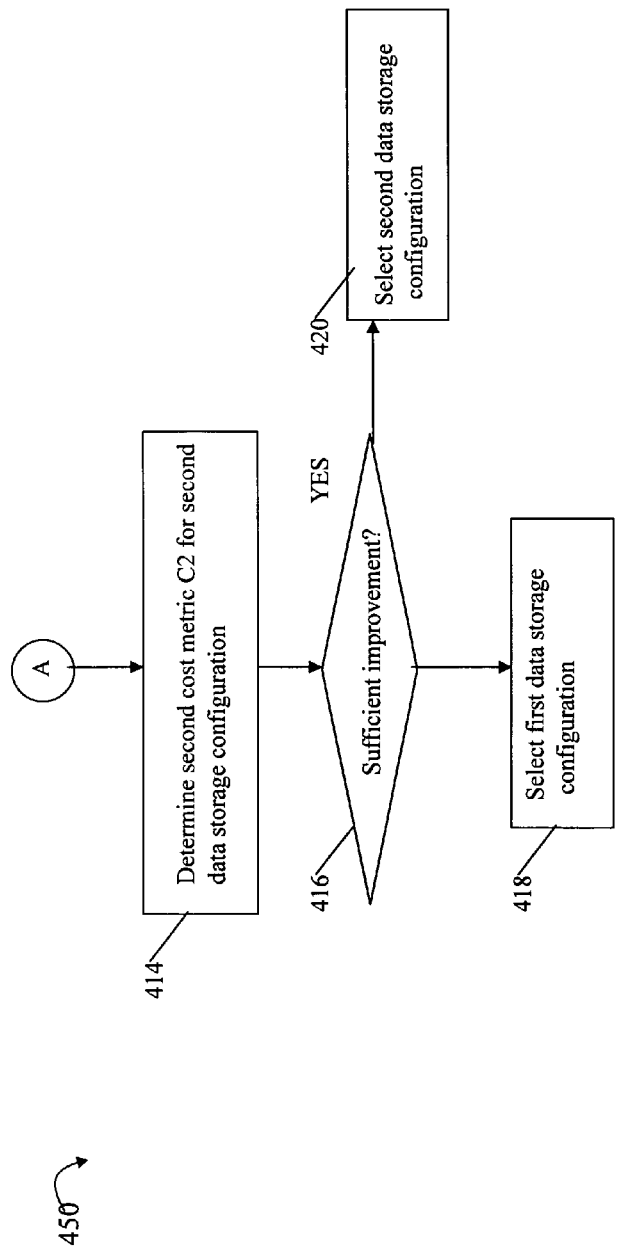

Referring to FIGS. 9A and 9B, shown are flowcharts of processing steps that may be performed in an embodiment in accordance with techniques herein. The steps of FIGS. 9A and 9B summarize processing described above. At step 402, a first data storage configuration for physical disk drives D1 and D2 is determined. The configuration indicates what data is stored on each physical drive, for example, as illustrated in connection with FIG. 6 indicating which LVs have data stored on each drive. The first data storage configuration may represent a current existing configuration for D1 and D2. In step 404, RT and RATE values for each of D1 and D2 in accordance with the first configuration are obtained. The values obtained in step 404 are as described above in connection with EQUATION 1 for determining the cost metric. In the case where the first configuration represents an actual current configuration, the values in step 404 may be determined in accordance with collected performance data. At step 406, a first cost metric C1 is determined for the first data storage configuration using the values obtained in step 404. The first cost metric of step 406 is determined as described in EQUATION 1 above. At step 408, a second data storage configuration for physical disk drives D1 and D2 is determined. The second data storage configuration may be a candidate or hypothetical configuration being evaluated for comparison to the first data storage configuration. For example, as illustrated in FIG. 6, the second data storage configuration may be the result of selecting one or more LVs having data on one or more of D1 and D2 where such selected LVs have their data moved between D1 and D2. As described above, such data movement may include moving data from D1 to D2 and/or from D2 to D1. At step 410, RT and RATE values for each of D1 and D2 in accordance with the second configuration are obtained. The values obtained in step 410 are as described above in connection with EQUATION 1 for determining the cost metric. Step 410 may include using the appropriate performance characteristic curves or tables (e.g., Figures as described and illustrated in connection with FIGS. 7 and 8) also includes performing any necessary adjustments and/or conversions for the RT and RATE values for the second data storage configuration are performed. For example, step 410 includes using the appropriate performance characteristic curve or table for each of D1 and D2, adjusting any such values for different average I/O sizes (e.g., based on EQUATIONS 2, 3, 4 and 5), and performing any conversions of values for RTs and RATE to account for different RAID protection levels or types. At step 414, a second cost metric C2 is determined for the second data storage configuration using the values obtained as a result of step 410. The cost metric of step 414 is determined as described in EQUATION 1 above. At step 416, a determination is made using C1 and C2 as to whether the second data storage system configuration provides a sufficient performance improvement over the first data storage configuration. Step 416 may include performing a comparison between C1 and C2 and determining whether C2<C1. Step 416 may also include using a threshold indicating an amount by which the second data storage configuration has to improve the performance of the first data storage configuration in order to actually implement the data movement of the second data storage configuration. In an embodiment using such a threshold, step 416 may include determining whether the mathematical difference between C2 and C1 indicates at least a threshold amount of improvement (e.g., determine whether C1−C2<threshold). If step 416 evaluates to yes, control proceeds to step 420 to select the second data storage configuration as providing a sufficient improvement over the first data storage configuration. If step 416 evaluates to no, control proceeds to step 418 to select the first data storage configuration and indicating that the second data storage system has been evaluated as not providing a sufficient improvement over the first data storage system. In the event that multiple different alternative second configurations are being considered, an embodiment may determine a cost metric for each alternative configuration, determine which of these alternative configurations has the smallest cost metric C, and use this smallest cost metric C in connection with FIGS. 9A and 9B processing. The foregoing and other variations and uses of the techniques herein will be appreciated by those of ordinary skill in the art.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for determining whether to move data between devices comprising:
   determining a first cost metric for a first device and a second device, said first cost metric being a sum of a first mathematical product and a second mathematical product, said first mathematical product being a result of a first response time for said first device multiplied by a first processing rate for said first device indicating a number of I/O operations processed per unit of time, said second mathematical product being a result of a second response time for said second device multiplied by a second processing rate for said second device indicating a number of I/O operations processed per unit of time, wherein said first response time and said second response time are modeled using one or more performance curves providing modeled response times for corresponding I/O operation processing rates;

selecting at least one portion of data for a hypothetical movement between said first device and said second device;

determining a second cost metric for the first device and the second device based on hypothetically moving said at least one portion of data between said first device and said second device, wherein hypothetically moving said at least one data portion between said first device and said second device models relocating said at least one data portion from one of said first device and said second device to another of said first device and said second device without issuing any read or write commands to any of the first device and the second device, said second cost metric being a sum of a third mathematical product and a fourth mathematical product, said third mathematical product being a result of a third response time for said first device multiplied by a third processing rate for said first device indicating a number of I/O operations processed per unit of time, said fourth mathematical product being a result of a fourth response time for said second device multiplied by a fourth processing rate for said second device indicating a number of I/O operations processed per unit of time, wherein said third response time and said fourth response time are modeled using said one or more performance curves providing modeled response times for corresponding I/O operation processing rates, wherein said one or more performance curves are previously determined prior to said determining said first cost metric and prior to determining said second cost metric and include one or more tables of stored data, each of said first response time, second response time, said third response time, and said fourth response time being determined in accordance with at least one response time obtained from at least one of the one or more tables; and determining, using said first cost metric and said second cost metric, whether to move said at least one portion of data.

2. The method of claim 1, wherein said first device and said second device are disks and said at least one portion of data includes one or more logical volumes of storage.

3. The method of claim 1, wherein said method is performed by an optimizer in connection with performing optimization processing on a data storage system.

4. The method of claim 1, wherein said at least one portion of data includes a first portion located on said first device and a second portion located on said second device, said selecting including selecting said first portion for movement from said first device to said second device and selecting said second portion for movement from said second device to said first device, said second cost metric reflecting movement of said first portion to said second device and said second portion to said first device.

5. The method of claim 1, wherein said first cost metric corresponds to a current data storage configuration and said second cost metric corresponds to an alternative data storage configuration being evaluated by an optimizer as a candidate for data movement.

6. The method of claim 1, wherein said first device and second device have one or more different device performance characteristics, each of said device performance characteristics characterizing drive performance capabilities.

7. The method of claim 6, wherein said first device is a first type of disk drive having first performance characteristics and said second device is a second type of disk drive different from said first type having second performance characteristics different from said first performance characteristics.

8. The method of claim 7, further comprising:
adjusting said first response time to said third response time, said first processing rate to said third processing rate, said second response time to said fourth response time, and said second processing rate to said fourth processing rate in accordance with said selecting and using performance characteristic information for said first device and said second device.

9. The method of claim 8, wherein said performance characteristic information includes first performance characteristic information for devices of said first type for I/O operations of a first size, said first performance characteristic information including a plurality of processing rates indicating a number of I/O operations processed per unit of time for devices of said first type and, for each of said plurality of processing rates, a corresponding response time.

10. The method of claim 9, further comprising:
adjusting a first value determined using said performance characteristic information for I/O operations of said first size to a second value used in connection with I/O operations of a second size.

11. The method of claim 10, wherein said first value and said second value are either processing rates indicating a number of I/O operations processed per unit of time or response times.

12. The method of claim 1, wherein, when said first device has a first RAID protection level and said second device has a second RAID protection level different from said first RAID protection level, the method further comprises adjusting said first processing rate, said second processing rate, said third processing rate and said fourth processing rate in accordance with differences between said first RAID protection level and said second RAID protection level and in accordance with moving said at least one portion of data between said first device and said second device.

13. The method of claim 1, further comprising:
determining whether the second cost metric is less than the first cost metric.

14. The method of claim 1, further comprising:
determining whether the second cost metric indicates that the second configuration provides an improvement over the first configuration by a threshold amount.

15. The method of claim 14, wherein said threshold amount is represented as a percentage.

16. A non-transitory computer readable medium comprising code stored thereon for that determines whether to move data between devices, the computer readable medium comprising code, that when executed by a processor, performs a method comprising:

determining a first cost metric for a first device and a second device, said first cost metric being a sum of a first mathematical product and a second mathematical product, said first mathematical product being a result of a first response time for said first device multiplied by a first processing rate for said first device indicating a number of I/O operations processed per unit of time, said second mathematical product being a result of a second response time for said second device multiplied by a second processing rate for said second device indicating a number of I/O operations processed per unit of time, wherein said first response time and said second response time are modeled using one or more performance curves providing modeled response times for corresponding I/O operation processing rates;

selecting at least one portion of data for a hypothetical movement between said first device and said second device;

determining a second cost metric for the first device and the second device based on hypothetically moving said at least one portion of data between said first device and said second device, wherein hypothetically moving said at least one data portion between said first device and said second device models relocating said at least one data portion from one of said first device and said second device to another of said first device and said second device without issuing any read or write commands to any of the first device and the second device, said second cost metric being a sum of a third mathematical product and a fourth mathematical product, said third mathematical product being a result of a third response time for said first device multiplied by a third processing rate for said first device indicating a number of I/O operations processed per trait of time, said fourth mathematical product being a result of a fourth response time for said second device multiplied by a fourth processing rate for said second device indicating a number of I/O operations processed per unit of time, wherein said third response time and said fourth response time are modeled using said one or more performance curves providing modeled response times for corresponding I/O operation processing rates, wherein said one or more performance curves are previously determined prior to said determining said first cost metric and prior to determining said second cost metric and include one or more tables of stored data, each of said first response time, said second response time, said third response time, and said fourth response time being determined in accordance with at least one response time obtained from at least one of the one or more tables; and determining, using said first cost metric and said second cost metric, whether to move said at least one portion of data.

17. The non-transitory computer readable medium of claim 16, herein said first device and said second device are disks and said at least one portion of data includes one or more logical volumes of storage.

18. The non-transitory computer readable medium of claim 16, wherein said code on the computer readable medium is executed in connection with performing optimization processing on a data storage system.

19. The non-transitory computer readable medium of claim 16, wherein said at least one portion of data includes a first portion located on said first device and a second portion located on said second device, said selecting including selecting said first portion for movement from said first device to said second device and selecting said second portion for movement from said second device to said first device, said second cost metric reflecting movement of said first portion to said second device and said second portion to said first device.

20. The non-transitory computer readable medium of claim 16, wherein said first cost metric corresponds to a current data storage configuration and said second cost metric corresponds to an alternative data storage configuration being evaluated by an optimizer as a candidate for data movement, wherein said first device and second device have one or more different device performance characteristics, each of said device performance characteristics characterizing drive performance capabilities.

* * * * *